Aug. 20, 1935.  C. M. RHOADES  2,012,071
BELT CONNECTER
Filed Jan. 17, 1934  2 Sheets-Sheet 1
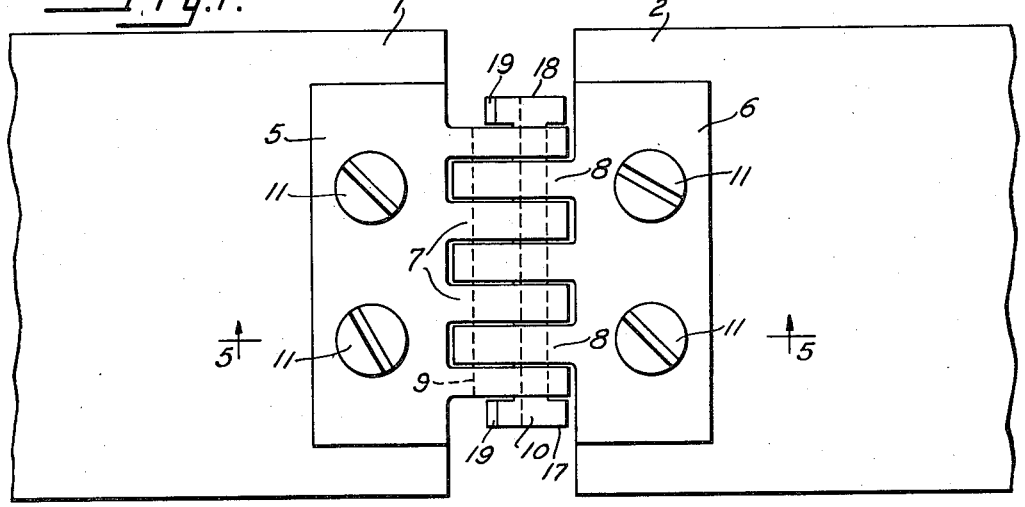
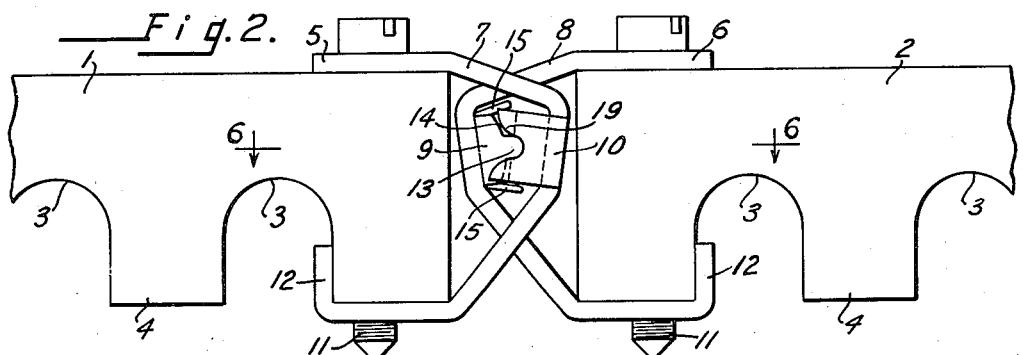
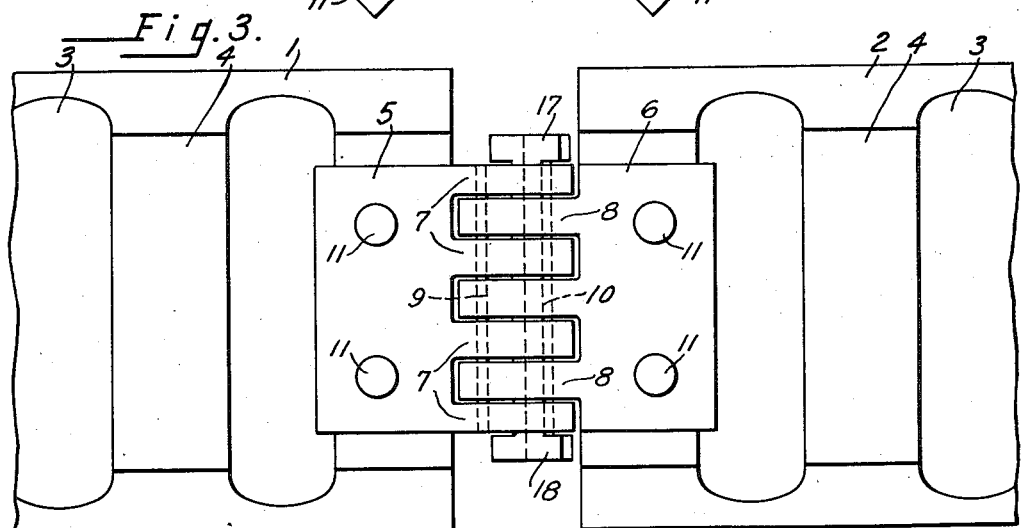
INVENTOR
CHARLES M. RHOADES.
BY Toulmin & Toulmin
ATTORNEYS Aug. 20, 1935.  C. M. RHOADES  2,012,071
BELT CONNECTER
Filed Jan. 17, 1934  2 Sheets-Sheet 2
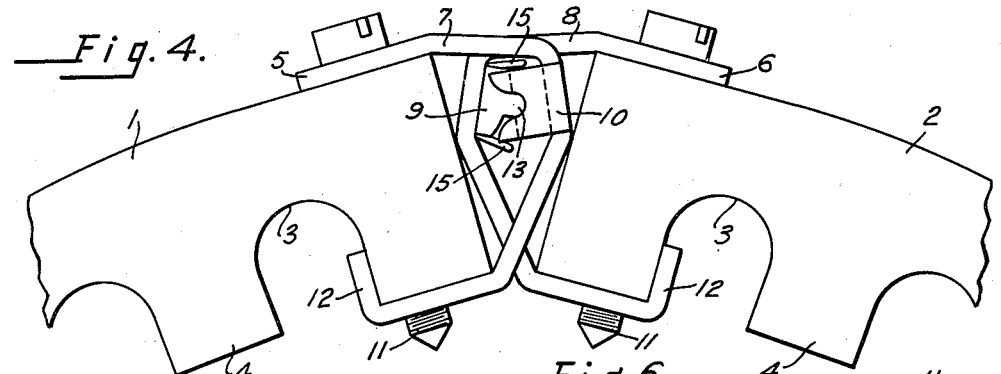
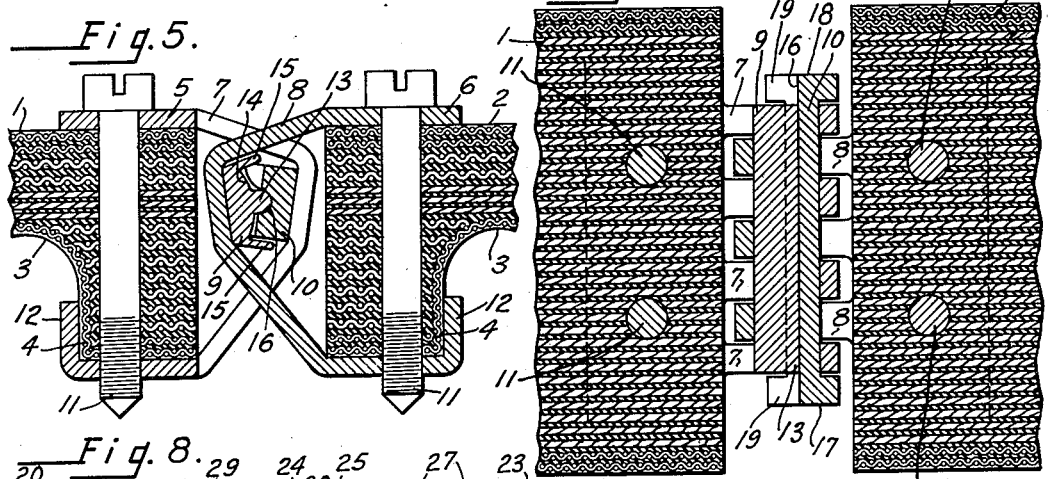
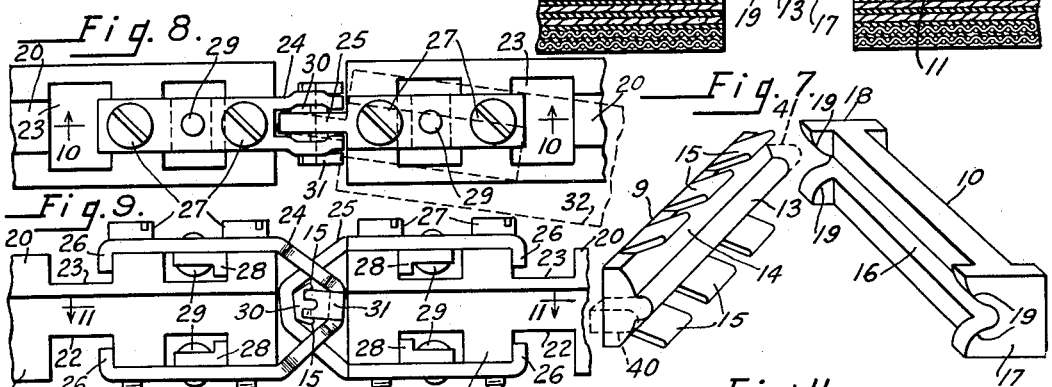
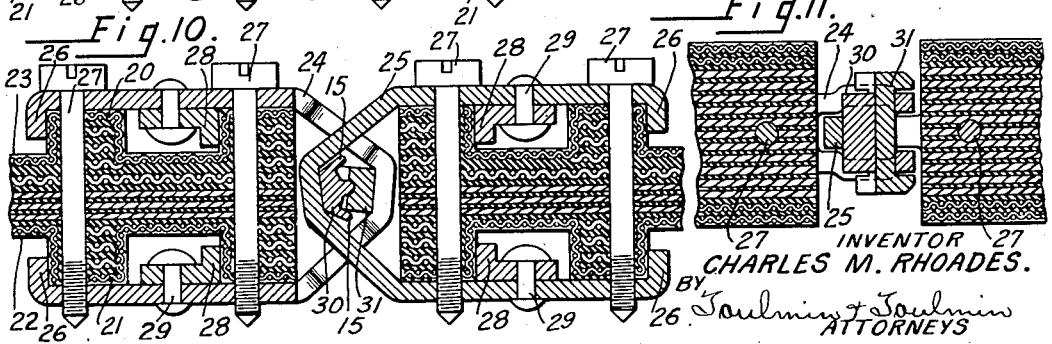
INVENTOR
CHARLES M. RHOADES.
BY
ATTORNEYS Patented Aug. 20, 1935

2,012,071

UNITED STATES PATENT OFFICE 2,012,071

BELT CONNECTER

Charles M. Rhoades, Dayton, Ohio, assignor to The Dayton Rubber Mfg. Company, Dayton, Ohio, a corporation of Ohio Application January 17, 1934, Serial No. 706,990

16 Claims. (Cl. 24—33)

This invention relates to belt connecters, and especially to belt connecters having interlacing clamping members and pintle members held therebetween.

The problem of the present invention was to provide means of preventing the dislocation of the engaging pintle members in such a belt connecter, this dislodgment in ordinary belt connecters having been found to cause breakage of the connecter and consequent inoperativeness of the machine.

One object of my invention is to provide a belt connecter with interlacing clamping members having pintle members held therebetween, one of these pintle members having means for preventing its dislodgment from engagement with the other pintle member.

Another object is to provide a belt connecter of the above type in which one pintle member is provided with wings which prevent its being dislodged from engagement with the other pintle member when the two pintle members are held together by the clamping members of the belt connecter.

Another object is to provide such a belt connecter with pintle members, one of which is provided with wings, these pintle members having interengaging grooves and ridges whereby the pintle members may rock relatively to one another without becoming dislodged while in operation.

Another object is to provide such a belt connecter having interlacing clamping members with pintle members held therebetween, one of said pintle members being provided with angularly disposed wings which engage the adjacent portions of one of the clamping members to prevent the dislodgment of one pintle member relative to the other pintle member, both pintle members having flat backs engaging flattened portions of the clamping members.

In the drawings:

Figure 1 is a top plan view of the belt connecter of my invention, shown as connecting the ends of a belt.

Figure 2 is a side elevation of the belt connecter and belt ends shown in Figure 1.

Figure 3 is a bottom plan view of the construction shown in Figures 1 and 2.

Figure 4 is a side elevation similar to Figure 2, but with the opposing belt ends arranged at an angle to one another, as when the belt passes around a pulley of comparatively small diameter.

Figure 5 is a vertical section along the line 5—5 of Figure 1.

Figure 6 is a horizontal section along the line 6—6 of Figure 2.

Figure 7 is a perspective view showing the male and female pintle members in separated positions.

Figure 8 is a top plan view of the invention as applied to a double-V or hexagonal type of belt.

Figure 9 is a side elevation of the construction shown in Figure 8.

Figure 10 is an enlarged vertical section along the line 10—10 of Figure 8.

Figure 11 is a horizontal section along the line 11—11 of Figure 9.

Referring to the drawings in detail:

Figure 1 shows the ends 1 and 2 of a belt, preferably of fabric-and-rubber construction of trapezoidal cross section, with the ends joined by the belt connecter of my invention. The belt is shown as containing cut-away portions 3 (Figure 2) these providing tooth-like portions 4 on the inner side of the belt. These tooth-like portions 4 permit the inner surface of the belt to acquire a shorter extent than the outer surface when the belt is passing around pulleys of small diameter or of close shaft separations. It will be understood, however, that the invention is equally applicable to belts lacking these cut-away portions 3 and tooth-like portions 4.

The belt connecter of my invention consists of oppositely disposed clamp portions 5 and 6 (Fig. 1) having interlacing tooth-like portions 7 and 8 respectively. These tooth-like portions form, in side appearance, a shape roughly similar to that of the letter C. The opposite tooth-like portions 7 and 8 pass by one another in assembly (Fig. 2), the space therebetween being adapted to contain a pair of interengaging pintle members 9 and 10 respectively (Figs. 2 and 7). The clamp portions 5 and 6 are secured to the belt ends 1 and 2 by means of the screws 11 passing therethrough. The inner end of each clamp portion 5 or 6 is preferably turned upward as at 12, in order to give a stronger grip on the ends of the belt.

The pintle portions 9 and 10 (Fig. 7) comprise elongated members adapted to contact one another in rocking engagement. The male pintle member 9 is provided with a rib 13 on its inner surface 14. The upper and lower edges of the male pintle member 9 are provided with wing-like projections 15 which, as hereinafter explained, serve to hold the two pintle members 9 and 10 in engagement and prevent dislodgment or "cocking" thereof. These projections 15 may be provided on one or both sides of the pintle member 9, or may comprise a solid ridge, as desired. It is also understood that these projections may be placed on the edges of the female pintle member 10 without exceeding the scope of my invention.

The female pintle member 10 is of elongated construction and possesses a groove 16 running therealong. It also is provided with flanged heads 17 and 18, through which the groove 16 likewise passes. The inner surfaces of the heads 17 and 18 engage the outer ends of the male pintle member 9, preventing the endwise motion thereof. The flanged ends or heads 17 and 18 may be cut-away as at 19, in case it is desired to extend the rib 13 beyond each end of the body of the male pintle member 9, as shown in the dotted lines 40 and 41, in order for it to engage the groove 16 at the points where it passes through the head portions 17 and 18.

Thus the construction of the two pintle members permits the rib 13 to rockingly engage the groove 16. So long as the two pintle members are held in engagement with one another by the clamping members 5 and 6, dislodgment upward or downward is prevented by the wings or projections 15 on one of the pintle members. Accordingly these angularly disposed wings keep the opposite pintle member from jumping out of position and breaking the pivotal connection.

In Figures 8 to 11 inclusive, the belt connecter of my invention is shown as applied to a double-trapezoidal or hexagonal belt. This type of belt is preferably provided with upper and lower trapezoidal portions 20 and 21, the whole forming an approximate hexagon in cross section. The belt is preferably provided with cut-away portions 22 and 23 on its inner and/or outer surfaces, for the same purpose as previously mentioned.

The belt connecter as applied to this double-trapezoidal or hexagonal form of belt is provided with clamp portions 24 and 25 generally similar to the clamp portions 7 and 8 previously described. Both ends of the clamp members are preferably angled as at 26 (Fig. 9) in order to clamp the ends of the belt more firmly. The latter are held within the clamp by the screws 27 and also by the additional clamping lugs 28 riveted or otherwise secured to the clamp members 24 and 25, as by the rivets 29.

The clamp members 24 and 25 interlace with one another as before, and provide lodgment for pintle members 30 and 31 similar in construction to the pintle members 9 and 10 previously described, and having similar wings, grooves and ridges. The belt connecter shown in Figures 8 to 11 inclusive, however, possesses the additional feature of having a slight amount of transverse adjustability whereby one end of the belt may be transversely angled relative to the opposite end and still maintain a running connection between the two ends. This angled position of the belt is shown by the dotted lines 32 (Fig. 8) and under operating conditions occurs when, for example, a generator is being driven from the wheels of a truck or a train car and the latter is rounding a curve in the track.

In operation, the belt and its connecter are assembled, first by interlacing the clamp members 7 and 8 or 24 and 25, thus obtaining a space into which the male and female pintle members 9 and 10 or 30 and 31 respectively may be inserted. The belt ends are then placed in position between the clamping members and secured by the screws 11 or 21 respectively.

Thus it will be observed that I have provided a belt connecter in which the pintle members give adequate bearing engagement yet the latter are prevented from dislodgment or "cocking" by means positively engaging one of the pintle members. In this manner breakage is prevented, wear reduced, and shutdowns or inoperativeness prevented.

It will be understood that I desire to comprehend within my invention such modifications as may be necessary to adapt it to varying conditions and uses.

Having thus fully described my invention, what I claim as new and desire to secure by Letters Patent, is:

1. A belt connecter comprising interlaced clamping members having interengaging pintle members arranged therebetween, one of said pintle members having flanged ends adapted to prevent endwise motion of the other pintle member, and one of said pintle members having edge projections thereon and normally out of contact with the opposing pintle member for preventing the transverse dislodgment of said pintle members from interengagement with one another during operation.

2. A belt connecter comprising interlaced clamping members having interengaging pintle members arranged therebetween, one of said pintle members having flanged ends adapted to prevent endwise motion of the other pintle member, and one of said pintle members having wing-like projections therealong and normally out of contact with the opposing pintle member for preventing the transverse dislodgment of said pintle members from interengagement with one another during operation.

3. A belt connecter comprising interlaced clamping members having interengaging pintle members arranged therebetween, one of said pintle members having flanged ends adapted to prevent endwise motion of the other pintle member, and one of said pintle members having angularly disposed projections therealong and normally out of contact with the opposing pintle member for preventing the transverse dislodgment of said pintle members from interengagement with one another during operation.

4. A belt connecter comprising interlaced clamping members having interengaging pintle members arranged therebetween, one of said pintle members having flanged ends adapted to prevent endwise motion of the other pintle member, and one of said pintle members having edge projections thereon for preventing the transverse dislodgment of said pintle members from interengagement with one another during operation, said pintle members having bearing ridges and grooves with correspondingly-curved contacting surfaces.

5. A belt connecter comprising interlaced clamping members having interengaging pintle members arranged therebetween, one of said pintle members having a curved bearing projection engaging a correspondingly-curved bearing depression in the other pintle member whereby to distribute the thrust and reduce the wear thereof, and one of said pintle members having edge projections therealong for preventing the dislodgment of said pintle members from interengagement with one another during operation.

6. A belt connecter comprising interlaced clamping members having interengaging pintle members arranged therebetween, one of said pintle members having a bearing projection engaging a bearing depression in the other pintle member, and one of said pintle members having edge projections therealong for preventing the dislodgment of said pintle members from interengagement with one another during operation, one of said pintle members having end flanges, the bearing projection on one of said pintle members being extended beyond the ends of the body portion thereof to engage corresponding bearing depressions in the said end flanges.

7. A belt connecter comprising interlaced clamping members having interengaging pintle members arranged therebetween, one of said pintle members having end flanges and a curved groove, the other pintle member having a correspondingly-curved bearing rib adapted to engage said groove whereby to distribute the thrust and reduce the wear thereof and edge projections normally out of contact with the opposing pintle member and adapted to prevent the dislodgment of said pintle members from interengagement with one another during operation.

8. A belt connecter comprising interlaced clamping members having interengaging pintle members arranged therebetween, one of said pintle members having flanged ends adapted to prevent endwise motion of the other pintle member, and one of said pintle members having edge projections thereon and normally out of contact with the opposing pintle member for preventing the transverse dislodgment of said pintle members from interengagement with one another during operation, said pintle members having bearing ridges and grooves with correspondingly-curved contacting surfaces.

9. A belt connecter comprising interlaced clamping members having interengaging pintle members arranged therebetween, one of said pintle members having flanged ends adapted to prevent endwise motion of the other pintle member, and one of said pintle members having edge projections thereon and normally out of contact with the opposing pintle member for preventing the transverse dislodgment of said pintle members from interengagement with one another during operation, one of said pintle members having a central bearing ridge, the other of said pintle members having a central groove of corresponding configuration engaged by said ridge.

10. A pintle assembly for a belt connecter comprising a pair of interengaging pintle members, one of said members having edge projections normally out of contact with the opposing pintle member and adapted to prevent dislodgment of said pintle members from interengagement with one another during operation, and one of said pintle members having flanged ends adapted to prevent endwise motion of the other pintle member held therebetween.

11. A pintle assembly for a belt connecter comprising a pair of interengaging pintle members, one of said members having edge projections adapted to prevent dislodgment of said pintle members from interengagement with one another during operation, and one of said pintle members having flanged ends adapted to prevent endwise motion of the other pintle member held therebetween, said pintle members having a cooperating rib and groove, said rib extending beyond the body portion of its pintle member.

12. A pintle assembly for a belt connecter comprising a pair of interengaging pintle members, one of said members having edge projections adapted to prevent dislodgment of said pintle members from interengagement with one another during operation, and one of said pintle members having flanged ends adapted to prevent endwise motion of the other pintle member held therebetween, said pintle members having a cooperating rib and groove, said rib extending beyond the body portion of its pintle member and engaging grooves in the end flanges of the other pintle member.

13. A belt connecter comprising interlaced clamping members having inter-engaging pintle members arranged therebetween, one of said pintle members having flanged ends adapted to prevent endwise motion thereof relative to the clamping members, and one of said pintle members having angularly disposed wings adapted to engage portions of the clamping members adjacent thereto, whereby to prevent the dislodgment of said pintle members from inter-engagement with one another during operation.

14. A pintle assembly comprising a belt composed of alternate layers of rubber and fabric, and a belt connecter comprising interlaced clamping members secured to the ends of said belt and gripping the maximum thickness thereof, said clamping members having inter-engaging pintle members therebetween, one of said pintle members having angularly disposed edge projections normally out of contact with the opposing pintle member and adapted to prevent the dislodgment of said pintle members from inter-engagement with one another during operation.

15. A belt connecter comprising interlaced clamping members having inter-engaging pintle members arranged therebetween, one of said pintle members having a curved bearing projection engaging a correspondingly-curved bearing depression in the other pintle member whereby to distribute the thrust and reduce the wear thereof, said bearing projection being higher than the depth of said bearing depression, and one of said pintle members having angularly disposed edge projections therealong for preventing the dislodgment of said pintle members from inter-engagement with one another during operation.

16. A pintle assembly for a belt connecter comprising a pair of inter-engaging pintle members, one of said members having edge projections adapted to prevent dislodgment of said pintle members from inter-engagement with one another during operation, and one of said pintle members having flanged ends adapted to prevent endwise motion of the other pintle member held therebetween, said pintle members having a cooperating rib and groove of unequal depth, said rib extending beyond the body of its pintle member and engaging grooves in the end flanges of the other pintle member.

CHARLES M. RHOADES.